(12) United States Patent
Komma et al.

(10) Patent No.: US 7,317,676 B2
(45) Date of Patent: Jan. 8, 2008

(54) OPTICAL HEAD DEVICE AND OPTICAL INFORMATION APPARATUS USING THIS OPTICAL HEAD DEVICE, AND COMPUTER, OPTICAL DISK PLAYER, CAR NAVIGATION SYSTEM, OPTICAL DISK RECORDER AND OPTICAL DISK SERVER USING THIS OPTICAL INFORMATION APPARATUS

(75) Inventors: Yoshiaki Komma, Hirakata (JP); Hidenori Wada, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/565,190

(22) Filed: Nov. 30, 2006

(65) Prior Publication Data
US 2007/0086310 A1    Apr. 19, 2007

Related U.S. Application Data

(62) Division of application No. 10/504,375, filed as application No. PCT/JP03/01291 on Feb. 7, 2003, now Pat. No. 7,161,890.

(30) Foreign Application Priority Data

Mar. 6, 2002 (JP) ............................. 2002-059911

(51) Int. Cl.
*G11B 7/00* (2006.01)
(52) U.S. Cl. .................... 369/112.07; 369/112.04; 369/121; 369/122
(58) Field of Classification Search ............ 369/112.07
See application file for complete search history.

(56) References Cited

U.S. PATENT DOCUMENTS

| | | | | |
|---|---|---|---|---|
| 5,153,863 A | * | 10/1992 | Noda et al. ............... | 369/44.11 |
| 5,513,025 A | * | 4/1996 | Watanabe et al. ........... | 349/106 |
| 6,487,015 B2 | * | 11/2002 | Kitamura et al. ........... | 359/558 |
| 6,650,612 B1 | | 11/2003 | Matsuzaki et al. | |
| 6,757,215 B2 | * | 6/2004 | Garlick et al. ................. | 367/8 |
| 6,834,036 B1 | * | 12/2004 | Shiono et al. ......... | 369/112.03 |
| 6,839,189 B2 | * | 1/2005 | Honda ........................ | 359/719 |
| 6,873,590 B2 | * | 3/2005 | Takeuchi et al. ....... | 369/112.08 |
| 6,952,390 B2 | * | 10/2005 | Mimori .................. | 369/112.07 |
| 2001/0015850 A1 | * | 8/2001 | Kowarz et al. ............. | 359/572 |
| 2002/0172132 A1 | * | 11/2002 | Takeuchi et al. ....... | 369/112.08 |
| 2003/0053223 A1 | | 3/2003 | Takeuchi et al. | |

FOREIGN PATENT DOCUMENTS

| | | |
|---|---|---|
| JP | 2001-43559 | 2/2001 |
| JP | 2001-60336 | 3/2001 |

\* cited by examiner

*Primary Examiner*—Wayne Young
*Assistant Examiner*—Van T. Pham
(74) *Attorney, Agent, or Firm*—Hamre, Schumann, Mueller & Larson, P.C.

(57) ABSTRACT

Providing an objective lens with a large numerical aperture (NA), the present invention records or plays conventional optical disks such as CDs and DVDs at high light usage efficiency, using an optical head capable of recording or reproducing high-density optical disks. A diffraction optical element (8) is disposed in a light path of a first light beam of a first wavelength $\lambda 1$ (400 nm to 415 nm) and a second light beam of a second wavelength $\lambda 2$ (650 nm to 680 nm). And, the present invention principally emits 5th order diffracted light with respect to the first light beam, and principally emits 3rd order diffracted light with respect to the second light beam, from the diffraction optical element (8). Thus, a high diffraction efficiency of substantially 100% can be obtained with respect to both wavelengths.

11 Claims, 10 Drawing Sheets

OPTICAL HEAD DEVICE AND OPTICAL INFORMATION APPARATUS USING THIS OPTICAL HEAD DEVICE, AND COMPUTER, OPTICAL DISK PLAYER, CAR NAVIGATION SYSTEM, OPTICAL DISK RECORDER AND OPTICAL DISK SERVER USING THIS OPTICAL INFORMATION APPARATUS

CROSS-REFERENCE TO RELATED APPLICATIONS

This application is a Division of application Ser. No. 10/504,375, filed Aug. 12, 2004 now U.S. Pat. No. 7,161,890, which is a National Stage application of PCT/JP03/01291, filed Feb. 7, 2003, which applications are incorporated herein by reference.

TECHNICAL FIELD

The present invention relates to optical head devices for the purpose of recording information onto optical information media such as, for example, optical disks or optical cards and for reproducing or erasing information recorded onto the optical information media, relates to optical information apparatuses in which these optical head devices are used, and to various systems in which these optical information apparatuses are applied.

BACKGROUND ART

Optical memory technology that uses optical disks that have pit-shaped patterns as high-density, large-volume memory media is gradually being applied widely to and entering general use in digital audio disks, video disks, document file disks and also data files. Thus, the functions for using a minutely narrowed light beam to successfully achieve recording onto and reproduction of information from an optical disk with high reliability, are divided into three main functions, that is, a focusing function which forms a minute spot at the diffraction limit on the optical disk, focus control ("focus servo") and tracking control of the optical system, and pit signal ("information signal") detection.

With recent advances in optical system design technology and the shortening of the wavelengths of the semiconductor lasers serving as light sources, the development of optical disks containing volumes of memory at greater than conventional densities is progressing. As an approach towards higher densities, problems such as an increase in the aberrations due to slanting of the light axis (what is known as "tilt") were found when investigating an increase in the optical disk side numerical aperture (NA) of the focusing optical system that focuses light beams onto the optical disk. That is to say, the amount of aberration which occurs with respect to the tilt increases when the NA is increased. It is possible to prevent this by thinning down the thickness (substrate thickness) of the transparent substrate of the optical disk.

The substrate thickness of a Compact Disc (CD), which can be considered a first generation optical disk, is approximately 1.2 mm, and the optical head device for CDs uses a light source emitting infrared light (with a wavelength $\lambda 3$ that is 780 nm to 820 nm, with 800 nm as standard) and an objective lens with an NA of 0.45. Furthermore, the substrate thickness of a Digital Versatile Disc (DVD), which can be considered a second generation optical disk, is approximately 0.6 mm, and the optical head device for DVDs uses a light source emitting red light (with a wavelength $\lambda 2$ that is 630 nm to 680 nm, with 650 nm as standard), and an objective lens with an NA of 0.6. Moreover, the substrate thickness of a third generation optical disk is approximately 0.1 mm, and the optical head device for these disks uses a light source emitting blue light (with a wavelength $\lambda 1$ that is 390 nm to 415 nm, with 405 nm as standard), and an objective lens with an NA of 0.85.

It should be noted that in this specification, "substrate thickness" refers to the thickness from a surface of the optical disk (or the optical recording medium) on which the light beam is incident, to the information recording surface. As described above, the substrate thickness of the transparent substrate of the high-density optical disks is set to be thin. From the view point of economy and the space that is occupied by the device, it is preferable that an optical information apparatus can record and reproduce information from a plurality of optical disks having differing substrate thicknesses and recording densities. However for this, it is necessary to have an optical head device provided with a focusing optical system capable of focusing a light beam up to the diffraction limit onto a plurality of optical disks having differing substrate thicknesses.

Furthermore, if diffracting optical elements are used as the optical elements for constituting optical head devices, instead of the refracting optical elements such as lenses and prisms that are usually used, then the optical head devices can be made smaller, slimmer, and lighter.

Diffraction optical elements are optical elements that function by effectively utilizing the diffraction effect of light, and are characterized by corrugations of a depth that is in the order of the wavelength, or by having a refractive index distribution or amplitude distribution that is formed periodically or quasi-periodically on the surface. It is known in the art that if the period of the diffraction optical element is sufficiently large compared to the wavelength, then it is possible to raise the diffraction efficiency to substantially 100% by making the cross section saw tooth-shaped.

However, if the frequency is sufficiently large compared to the wavelength, then the diffracting efficiency of the diffraction optical element reaches 100% only with respect to the design wavelength. Generally, the diffraction efficiency steadily decreases as the wavelength diverges from its design value. Consequently, if diffraction optical elements are used in optical head devices in which light sources of a plurality of wavelengths are mounted so as to handle a plurality of varieties of optical disks, then the diffraction optical elements need to be optimally designed for each wavelength and disposed only in the light path of the wavelength thereof in order to raise the light utilization ratio.

A configuration whose object is to provide an optical head with high light usage efficiency, which has a light source of a plurality of wavelengths and diffraction optical elements that can handle a plurality of different varieties of information recording media, is disclosed in JP 2001-60336A (first conventional example). The first conventional example is described below with reference to FIG. 10.

FIG. 10 is a lateral view of the basic configuration and the state of light transmission of an optical head device according to the first conventional example. As shown in FIG. 10, in the optical head device of the first conventional example, a collimator lens 71 and an objective lens 18 are disposed in the light path from a laser light source 105 to the information recording medium such as a high density optical disk 9 or optical disk 11 such as a CD. The laser light source 105 is a light source that can selectively emit a first light beam of a first wavelength $\lambda 1$, and a third light beam of a third wavelength λ3, which has a wavelength substantially twice that wavelength. It should be noted that in the description below, wavelengths in the region of 660 nm are also considered, so that these are described as "second wavelengths". A laser light 205 that is emitted from the semiconductor laser light source 105 is converted to substantially parallel light by the collimator lens 71 after which its light axis is bent by a mirror 20. The light beam 205 whose light axis was bent by the mirror 20 is focused by the objective lens 18 onto the optical disk 9 or 11. The first wavelength λ1 of the first light beam that is emitted by the laser light source 105 satisfies, for example, the relationship 350 nm<λ1<440 nm, and its focal spot can be brought to a minute point by provision of the laser light source 105 that emits the first light beam of the first wavelength λ1. Furthermore, the third wavelength λ3 of the third light beam that is emitted by the laser light source 105 satisfies, for example, the relationship 760 nm<λ3<880 nm, and optical disks such as CDs and CD-Rs can be read out by provision of the laser light source 105 that emits the third light beam of the third wavelength λ3. In this manner, in the optical head device of the first conventional example, the wavelength of the light that is emitted is determined according to the type of optical disk that is to be read out, and a light beam of that wavelength is emitted selectively.

Furthermore, in the optical head device of the first conventional example, a diffraction optical element 85 is disposed in the light path between the mirror 20, which bends the light axis, and the objective lens 18, for the purpose of correcting chromatic aberrations of the objective lens 18. Here, the objective lens 18 and the collimator lens 71 are aspherical lenses.

As described above, the diffraction optical element generally shows a high diffraction efficiency with respect to the design wavelength, but the diffraction efficiency gradually decreases as it diverges from this. Consequently, when the diffraction optical element is disposed in the light path is passed by both the light beam of the design wavelength and light beams other than this, the diffraction efficiency deteriorates with respect to one of the wavelengths.

However, if the period of the diffraction optical grating is sufficiently large compared to the wavelength, then when the wavelength is approximately half the design wavelength, the first order diffraction efficiency is substantially 0, but the second order diffraction efficiency is exceptionally high at substantially 100%.

In the first conventional example, an optical head device is disclosed in which, in a two wavelength optical head device that is capable of handling both high density optical disks that use a blue light source and optical disks such as CDs and CD-Rs, setting the relationship of the wavelength size of the two wavelengths to be approximately double (in actual fact, it is in the order of 1.8 to 2.1), by principally emitting second order diffracted light from the diffraction optical element 85 when handling the high density optical disks (when using the first light beam of the first wavelength λ1) and by principally emitting first order diffracted light from the diffraction optical element 85 when handling optical disks such as CDs and CD-Rs (when using the third light beam of the third wavelength λ3), then a high diffraction efficiency can be obtained with respect to either wavelength even if the diffraction optical element 85 is disposed in the same light path, and as a result, an optical head device that is capable of achieving excellent optical characteristics, is attained.

Furthermore, a diffraction angle of the diffraction optical element is determined by the wavelength, the frequency and the diffraction order, however in the first conventional example, by using mainly second order diffracted light at the first wavelength λ1, and using mainly first order diffraction light at the third wavelength λ3, which has a wavelength substantially twice as long, the same diffracting angle can be set, even if the wavelength differs.

The cross-section of the diffraction optical element is substantially saw tooth-shaped. In the case of a transparent-type element in the first conventional example, the depth h of the saw tooth-shape is set such that it is practically within the range from h1=2λ1/(n−1) to h3=λ3/(n−1) with respect to the first wavelength λ1, the third wavelength λ3 and the refractive index n of the material of the diffraction optical element 85, such that the diffraction efficiency is large for all of the wavelengths. For example, if λ1=400 nm, λ3=800 nm and n=1.5, then because h1=h3, with the transparent type element, h=1.6 μm.

Moreover, in the first conventional example, a case is also disclosed in which DVDs, which are optical disks of higher density than CDs, can be interchangeably recorded and reproduced by also providing a laser light source that emits a light beam of a second wavelength λ2, which has a wavelength substantially 1.5 times that of the light beam of the first wavelength λ1. In this case, a single, or a plurality of diffraction optical elements are disposed in the light path of the three wavelength light beam. The diffraction optical element principally emits sixth order diffraction light with respect to the light beam of the first wavelength λ1, principally emits third order diffraction light with respect to the light beam of the third wavelength λ3, and principally emits fourth order diffraction light with respect to the light beam of the second wavelength λ2.

In the first conventional example, it seems that the second wavelength λ2 that is capable of recording and reproducing DVDs satisfies the relationship 570 nm<λ2<680 nm. However, from the ease of manufacture of semiconductor laser light sources, it is preferable that the second wavelength λ2 is set to 650 nm to 680 nm, and in actual commercially available DVD optical information apparatuses, wavelengths of 650 nm to 680 nm are used, with 660 nm as the standard.

Furthermore, due to the ease of manufacture of the semiconductor lasers it is also preferable that the first wavelength λ1 for optical disks of an even higher density than next generation DVDs is set to 400 nm to 410 nm, with 405 nm as the standard.

Using laser light sources having the first wavelength λ1 and the second wavelength λ2, it is useful to use diffraction optical elements for correcting chromatic aberrations and the like, even in optical systems in which DVDs, and optical disks of a higher density than the next generation DVDs are recorded and reproduced.

BK7 glass is widely used as a material for the diffraction optical element. The refractive index n1 of BK7 is approximately 1.5302 with respect to the first light beam of the first wavelength λ1=405 nm.

Setting the cross-section grating shape of the diffraction optical element to be saw tooth-shaped, in order to achieve a diffraction grating whose second order diffraction efficiency is substantially 100%, as in the first conventional example, the depth h of the saw tooth shape (the height of the saw tooth) is:

$$h=2\lambda 1/(n1-1)=1530 \text{ nm}.$$

Furthermore, the refractive index n2 of BK7 is approximately 1.5142 with respect to the second light beam of the second wavelength λ2=660 nm. Thus, the light path difference that the depth of the saw tooth shape (the height of the saw tooth) h applies to the second light beam of the second wavelength λ2 is:

$h(n2-1)$ $=786$ nm $=1.19\ λ2$

Thus, because the light path difference that the depth of the saw tooth shape (the height of the saw tooth) h applies to the second light beam of the second wavelength λ2 is not an integer multiple of the second wavelength λ2, the second order diffraction efficiency decreases, and even the first order diffraction efficiency is about 80%.

Setting the cross-section grating shape of the diffraction optical element to be saw tooth-shaped, in order to achieve a diffraction grating whose sixth order diffraction efficiency is substantially 100%, as in a further embodiment disclosed according to the first conventional example, the depth h of the saw tooth shape (the height of the saw tooth) is:

$h=6λ1/(n1-1)=4580$ nm.

Thus, the light path difference that the depth of the saw tooth shape (the height of the saw tooth) h applies to the second light beam of the second wavelength λ2 is:

$h(n2-1)$ $=2357$ nm $=3.57\ λ2.$

In this manner, because the light path difference that the depth of the saw tooth shape (the height of the saw tooth) h applies to the second light beam of the second wavelength λ2 is not an integer multiple of the second wavelength λ2, the sixth order diffraction efficiency decreases and even the third order diffraction efficiency and the fourth order diffraction efficiency are lower than 60%. Furthermore, the loss becomes a scattered light component, and it is impossible to deny that this is a cause of degradation in signal quality. Moreover, even if the material is changed, there is not a big difference in scattering characteristics, so that even if a different material is selected, it cannot be expected that there will be a noticeable improvement.

Thus, as given above, the first conventional example has a problem in that the light usage efficiency is low when the second light beam of the second wavelength λ2 is used when interchanging DVDs.

DISCLOSURE OF THE INVENTION

It is an object of the present invention to solve the problems of the conventional art, and to provide optical head devices and optical information apparatuses that use such optical head devices that are capable of realizing interchangeable recording and interchangeable reproduction of a plurality of different types of optical information media, and to provide various systems applying the optical information apparatuses.

To achieve the object described above, a configuration of the optical head device according to the present invention provides one or plurality of laser light sources for emitting a first light beam of a first wavelength λ1 (400 nm to 415 nm) and a second light beam of a second wavelength λ2 (650 nm to 680 nm), an objective lens for focusing the first and second light beams that are emitted from the laser light source respectively onto first and second optical information media, and a diffraction optical element arranged in a light path of the first and second light beams, wherein the diffraction optical element principally emits 5N-th order diffracted light (N is a natural number) with respect to the first light beam, and principally emits 3N-th order diffracted light with respect to the second light beam.

Furthermore, in the configuration of the optical head device according to the present invention, it is preferable that the laser light source further emits a third light beam of a third wavelength λ3 (780 nm to 810 nm), and the third light beam is focused on a third optical information medium by the objective lens and that the diffraction optical element principally emits 5M-th order diffracted light (2M=N) with respect to the third light beam.

Furthermore, in the configuration of the optical head device according to the present invention, it is preferable that the diffraction optical element acts as a convex lens.

Furthermore, in the configuration of the optical head device according to the present invention, it is preferable that the diffraction optical element is disposed close to the objective lens, and that the diffraction optical element and the objective lens are fixed as a single piece.

Furthermore, a configuration of an optical information apparatus according to the present invention provides the optical head device according to the present invention, an optical information medium drive portion for driving the optical information medium, and a control portion for receiving a signal obtained from the optical head device, and based on that signal, for controlling the optical information medium drive portion as well as the laser light source and the objective lens in the optical head device.

Furthermore, a configuration of a computer according to the present invention provides the optical information apparatus according to the present invention, an input device for inputting information, a processing unit for processing based on information input from the input device and/or information read out by the optical information apparatus, and an output device for display or output of the information input by the input device, information read out by the optical information apparatus, or a result processed by the processing unit.

Further, a configuration of an optical disk player according to the present invention provides the optical information apparatus according to the present invention, and an information-to-image conversion apparatus for converting the information signal obtained from the optical information apparatus to an image.

Furthermore, a configuration of a car navigation system according to the present invention provides the optical disk player according to the present invention.

Furthermore, a configuration of an optical disk recorder according to the present invention provides the optical information apparatus according to the present invention, and an image-to-information conversion apparatus for converting image information to information for recording onto the optical information medium by the optical information apparatus.

Furthermore a configuration of an optical disk server according to the present invention provides the optical information apparatus according to the present invention, and a wireless input/output terminal for exchanging information between the optical information apparatus and an external portion.

BEST MODE FOR CARRYING OUT THE INVENTION

The present invention is described below further, and in greater detail using the embodiments.

First Embodiment

Figure 1:
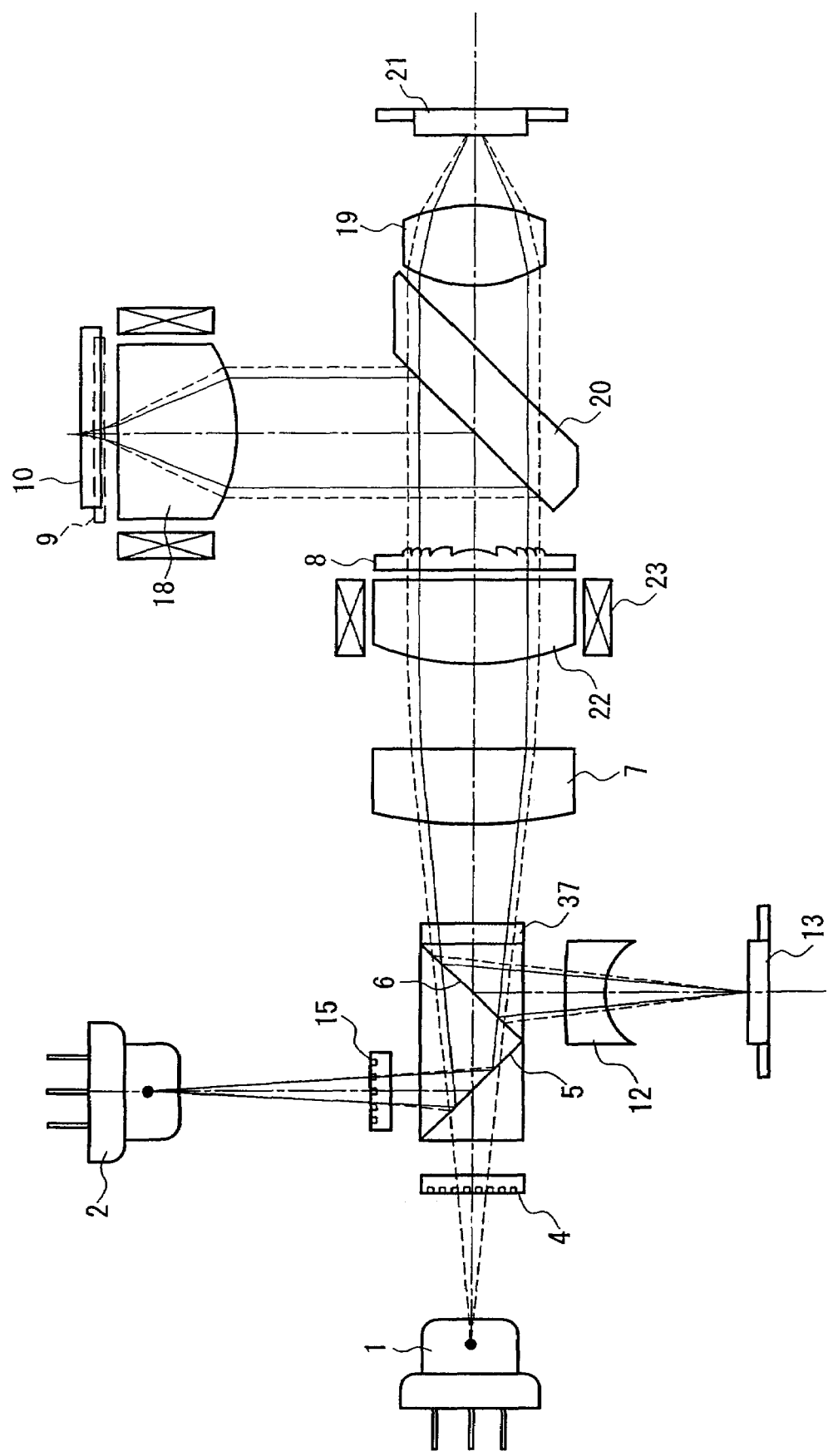
FIG. 1 is a structural overview showing an optical head device according to a first embodiment of the present invention.

FIG. 1 is a structural overview showing an optical head device according to a first embodiment of the present invention. In FIG. 1, numeral 1 indicates a first laser light source that emits a first light beam of a first wavelength $\lambda 1$, and numeral 2 indicates a second laser light source that emits a second light beam of a second wavelength $\lambda 2$. Numeral 7 indicates a collimator lens (a first convex lens), numeral 20 indicates a mirror for bending the light axis, and numeral 18 indicates an objective lens. Numeral 8 indicates a diffraction optical element that compensates for wavelength fluctuations of the first laser light source 1 that occur when there is a change in output intensity, and that reduces the amount of shift in the focal position (chromatic aberration) caused by the objective lens 18. The diffraction optical element 8 functions as a convex lens. Numerals 9 and 10 indicate an optical information medium such as an optical disk or an optical card, however in the explanations given below, the example of an optical disk as the optical information medium will be used.

It is preferable that some or all of the first and second laser light sources 1 and 2 are semiconductor laser light sources, thereby achieving more compact, lighter and more energy efficient optical head devices, and optical information apparatuses that use such devices. Here, the wavelength of the first laser light source 1 is the shortest, and the wavelength of the second laser light source 2 is longer than the wavelength of the first laser light source 1. The first laser light source 1 is used when recording and reproducing the highest recording density optical disk 9, whereas the second laser light source is used when recording and reproducing the lower recording density optical disk 10. In this case, because the wavelengths of the first and the second laser light sources 1 and 2 are defined as $\lambda 1 = 400$ nm to 415 nm, and $\lambda 2 = 650$ nm to 680 nm, thus presently commercially available DVDs and optical disks, which have even higher recording densities than DVDs, can be interchangeably recorded and reproduced.

The optical disk 9 with the highest recording density is recorded and reproduced by focusing the first light beam that is emitted from the first laser light source 1 onto the information recording surface (not illustrated) of the optical disk 9 as described below. That is to say, the first light beam of the first wavelength $\lambda 1$ that is emitted from the first laser light source passes through a wavelength selecting film (a dichroic film) 5, passes substantially completely through a beam splitter film 6, and is then converted to circularly polarized light by a ¼ wavelength plate 37. The first light beam that was converted to circularly polarized light by the ¼ wavelength plate 37 is converted to substantially parallel light by the collimator lens 7, and is then diffracted by the diffraction optical element 8. The first light beam that was diffracted by the diffraction optical element 8 has its light axis bent by the mirror 20, after which it passes through a transparent substrate of the optical disk 9, which has a substrate thickness of approximately 0.1 mm, and is focused on the information recording surface by the objective lens 18.

The first light beam that is reflected by the information recording surface of the optical disk 9 passes back along the light path (return path), is diffracted again by the diffraction element 8, and is then converted by the ¼ wavelength plate 37 to linearly polarized light that is polarized in a direction perpendicular to its initial polarizing direction. The first light beam that was converted to linearly polarized light that is polarized in a direction perpendicular to its initial polarizing direction is substantially completely reflected by the beam splitter film 6, and passes through a detecting lens 12 to be incident on a photodetector 13. Thus, it is possible to obtain the servo signal used in focus control and tracking, and the information signal, by calculating the output strength from the photodetector 13. As described above, with regard to the first light beam of the first wavelength $\lambda 1$ and the second light beam of the second wavelength $\lambda 2$, the beam splitter film 6 is a polarization separation film that allows linearly polarized light that is polarized in a predetermined direction to completely pass, and to completely reflect all light that is linearly polarized in a direction perpendicular to it.

It should be noted that, by also disposing a diffraction grating 4 in the optical path from the first laser light source 1 to the beam splitter film 6, it is possible to detect a tracking error signal by the method that is known in the art as the difference push pull (DPP) method.

Furthermore, instead of converting the first light beam to substantially parallel light with the collimator lens 7, it is also possible to provide a configuration in which the first light beam is converted to gently diverging light by a first convex lens 7 and the first light beam (the gently diverging light) is further converted to substantially parallel light by a second convex lens 22. Thus, in this case, by moving the second convex lens 22 in the direction of the light axis (horizontally, in FIG. 1) with a driving apparatus 23, the degree of parallelism of the first light beam can be changed. Incidentally, spherical aberrations occur when there is unevenness in the substrate thickness caused by discrepancies in the thickness of the transparent substrate, or when differences in substrate thickness are caused by interlayer thicknesses if the optical disk 9 is a double layer disk. However, it is possible to compensate for the spherical aberrations by moving the second convex lens 22 in the direction of the light axis as described above. By moving the second convex lens 22 in a manner such as is given above, about several hundreds of mλ of compensation for spherical aberrations can be made possible if the numerical aperture (NA) of the focusing light is 0.85 with regard to the optical disk 9, thereby compensating for a substrate thickness difference of ±30 µm.

Here, it is also possible to achieve a reduction in the number of parts by forming the diffraction optical element 8 on the surface of the collimator lens (first convex lens) 7 or on the second convex lens 22.

Furthermore, if the light axis bending mirror 20 is constituted such that it is not a totally reflecting mirror, but is a semi-transparent film that passes at most 20% of the amount of light of the first light beam, such that it guides the part of the first light beam that passed the mirror 20 to the photodetector 21 by a focusing lens (convex lens) 19, then it is possible to monitor changes in the amount of light emitted by the first laser light source 1 by using both the signal obtained from the photodetector 21 to feed back changes in the amount of light emitted, and to keep the amount of light emitted by the first laser light source 1 constant.

It should be noted that in the description above, the term "focus" was used, however in the present specification, "focus" means "converging a light beam to a minute spot at the diffraction limit".

Recording and reproduction of the second highest recording density optical disk 10 is performed by focusing the second light beam that is emitted from the second laser light source 2 onto an information recording surface (not shown) of the optical disk 10, as described below. That is to say, the substantially linearly polarized second light beam of the second wavelength λ2 that is emitted from the second laser light source 2 is reflected by the wavelength selecting film (dichroic film) 5 and further passes through the beam splitter film 6. The second light beam that has passed through the beam splitter film 6 is converted to circularly polarized light by the ¼ wavelength plate 37, is converted to substantially parallel light by the collimator lens 7, and is then diffracted by the diffraction optical element 8. The second light beam that was diffracted by the diffraction optical element 8, has its light axis bent by the mirror 20, after which it passes through the transparent substrate of the optical disk 10, which has a substrate thickness=approximately 0.6 mm, and is focused onto the information recording surface by the objective lens 18.

The second light beam that was reflected by the information recording surface of the optical disk 10 returns along the original optical path (return path), is again diffracted by the diffraction optical element 8, and is then reflected by the beam splitter film 6, passing through the detecting lens 12 to be incident on the photodetector 13. Thus, the servo signals used in focus control and tracking control, and the information signal, can be obtained by calculating the power output from the photodetector 13.

It should be noted that, by also disposing a diffraction grating 15 in the optical path from the second laser light source 2 to the beam splitter film 6, it is possible to detect a tracking error signal by the method that is known in the art as the difference push pull (DPP) method.

Furthermore, as described above, instead of converting the second light beam to substantially parallel light with the collimator lens 7, it is also possible to provide a configuration in which the second light beam is converted to gently diverging light by the first convex lens 7 and the second light beam (the gently diverging light) is further converted to substantially parallel light by a second convex lens 22. Thus, in this case, by causing the second convex lens 22 to move in the direction of the light axis (horizontally, in FIG. 1) by a driving apparatus 23, the degree of parallelism of the second light beam can be changed. Incidentally, spherical aberrations occur when there is unevenness in the substrate thickness caused by discrepancies in the thickness of the transparent substrate, or when differences in substrate thickness are caused by interlayer thicknesses if the optical disk 10 is a double layer disk, however it is possible to compensate for the spherical aberrations with a minimum of additional parts by employing a mechanism for moving the second convex lens 22 in the direction of the light axis, as described above.

Furthermore, if the light axis bending mirror 20 is constituted such that it is not a totally reflecting mirror, but is a semi-transparent film that passes at most 20% of the amount of light of the second light beam, such that it guides the part of the second light beam that passed the mirror 20 to the photodetector 21 by a focusing lens (convex lens) 19, then it is possible to monitor changes in the amount of light emitted by the second laser light source 2 by using both the signal obtained from the photodetector 21 to feed back changes in the amount of light emitted, and to keep the amount of light emitted by the second laser light source 2 constant.

Furthermore, in the present embodiment, the first and second laser light sources 1 and 2, which are separate devices, are configured so as to emit respectively the first light beam of the first wavelength λ1 and the second light beam of the second wavelength λ2, however it is also possible to use a single chip laser light source to emit the first and second light beams, thus achieving a reduction in the number of parts.

Figure 2:
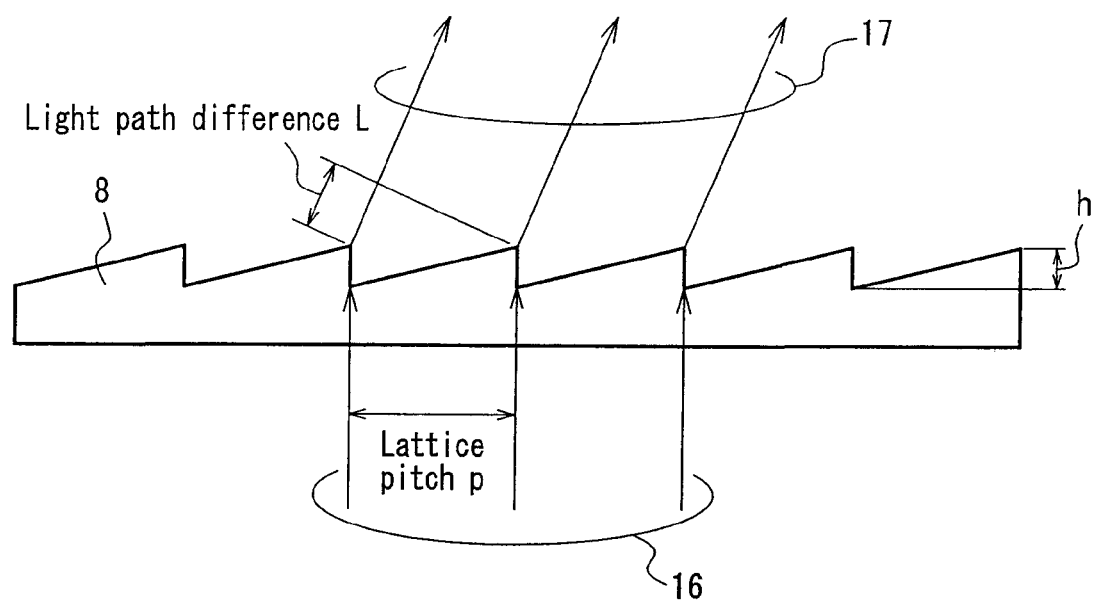
FIG. 2 is a cross-section view of an enlarged part of a diffraction optical element according to the first embodiment of the present invention.

Next, the lattice shape of the diffraction optical element 8 will be described with reference to FIG. 2. FIG. 2 is a cross-section view of an enlarged part of a diffraction optical element according to the first embodiment of the present invention. As shown in FIG. 2, when a lattice pitch of the transmitting-type diffraction optical element 8 is set to p (constant) and a height of the saw tooth-shaped blaze shape is set to h (constant), generally, with respect to incident light (parallel light) 16 of wavelength λ, diffracted light 17 is generated in a direction in which the wave path difference L is an integer multiple of the wavelength λ. In this case, when the wave path difference applied by the height h of the saw tooth-shaped blaze form is equal to the light path difference L, diffraction efficiency is maximal, and this is the principal diffractive order. When the refractive index of the material constituting the diffraction optical element 8 is n, this condition can be expressed as:

$$L=h(n-1).$$

The inventors of the present invention have found that, in contrast to the first conventional example, by configuring the saw tooth-shaped blazed hologram (the diffraction optical element 8) as shown in FIG. 2, such that the first light beam of the first wavelength λ1 (400 nm to 415 nm) is emitted at principally 5N-th order diffracted light (where N is a natural number), and the second light beam of the second wavelength λ2 (650 nm to 680 nm) is emitted at principally 3N-th order diffracted light, a high diffraction efficiency with respect to the light beams of both wavelengths can be can be simultaneously achieved. For example, by configuring the diffraction optical element such that the first light beam of the first wavelength λ1 (400 nm to 415 nm) is emitted at principally 5th order diffracted light, and the second light beam of the second wavelength λ2 (650 nm to 680 nm) is emitted at principally 3rd order diffracted light, a high diffraction efficiency can be can be simultaneously achieved with respect to the light beams of both wavelengths. This is described below.

If the saw tooth-shaped blazed hologram as shown in FIG. 2 is formed from glass (BK7), then in order to maximize the fifth order diffraction efficiency of the first light beam of the first wavelength λ1 (standard value 405 nm), it is preferable that the light path difference, which is dependent on the height h of the saw tooth-shaped blaze shape, is set to five times the first wavelength λ1 and thus the height h of the saw tooth-shaped blaze shape is optimally set to:

$h=5\lambda 1/(n1-1)$ $=3820$ nm.

Here, n1 is the refractive index of BK7 with respect to the first wavelength λ1=405 nm, and is approximately 1.5302.

Furthermore, the diffracting pattern can be designed by assuming the wavelength λ is five times the first wavelength λ1.

At this time, the light path difference that the saw tooth-shaped blaze shape of height h applies to the second light beam of the second wavelength λ2 (standard value 660 nm) for recording on or reproducing from DVDs, is:

$h(n2-1)$ $=1964$ nm $=2.98\ \lambda 2$.

In this manner, because the light path difference, which the height h of the saw tooth-shaped blaze shape applies to the second light beam of the second wavelength λ2 for the purpose of recording or reproducing DVDs is substantially three times the second wavelength λ2, the 3rd order diffraction efficiency can be set to substantially 100%. Here, n2 is the refractive index of BK7 with respect to the second wavelength λ2=660 nm, and is approximately 1.5142.

As for the scattering characteristics, because there is not a large difference even if the materials are changed, then the same effect can be obtained even if another material is selected for the diffraction optical element 8, such as plastic (resin).

Thus, in an optical head device provided with a single or a plurality of laser light sources for emitting the first light beam of the first wavelength λ1 (400 nm to 415 nm) and the second light beam of the second wavelength λ2 (650 nm to 680 nm), and an objective lens for focusing the first and second light beams that are emitted from the laser light source respectively on to the first and second optical information media, by further providing a diffraction optical element in the light paths of the first and second light beams that principally emit 5N-th order diffracted light (where N is a natural number) with respect to the first light beam and principally emits 3N-th order diffracted light with respect to the second light beam, a high diffraction efficiency of substantially 100% can be simultaneously achieved with respect to both light beams. Consequently, high light usage efficiency can be achieved when recording or reproducing DVDs, and when recording or reproducing optical disks that have even higher recording and reproduction densities. Furthermore, it is also possible to achieve optical head devices that have no noise generated by stray light from needlessly diffracted light, and that have low power consumption and low heat generation.

Second Embodiment

Figure 3:
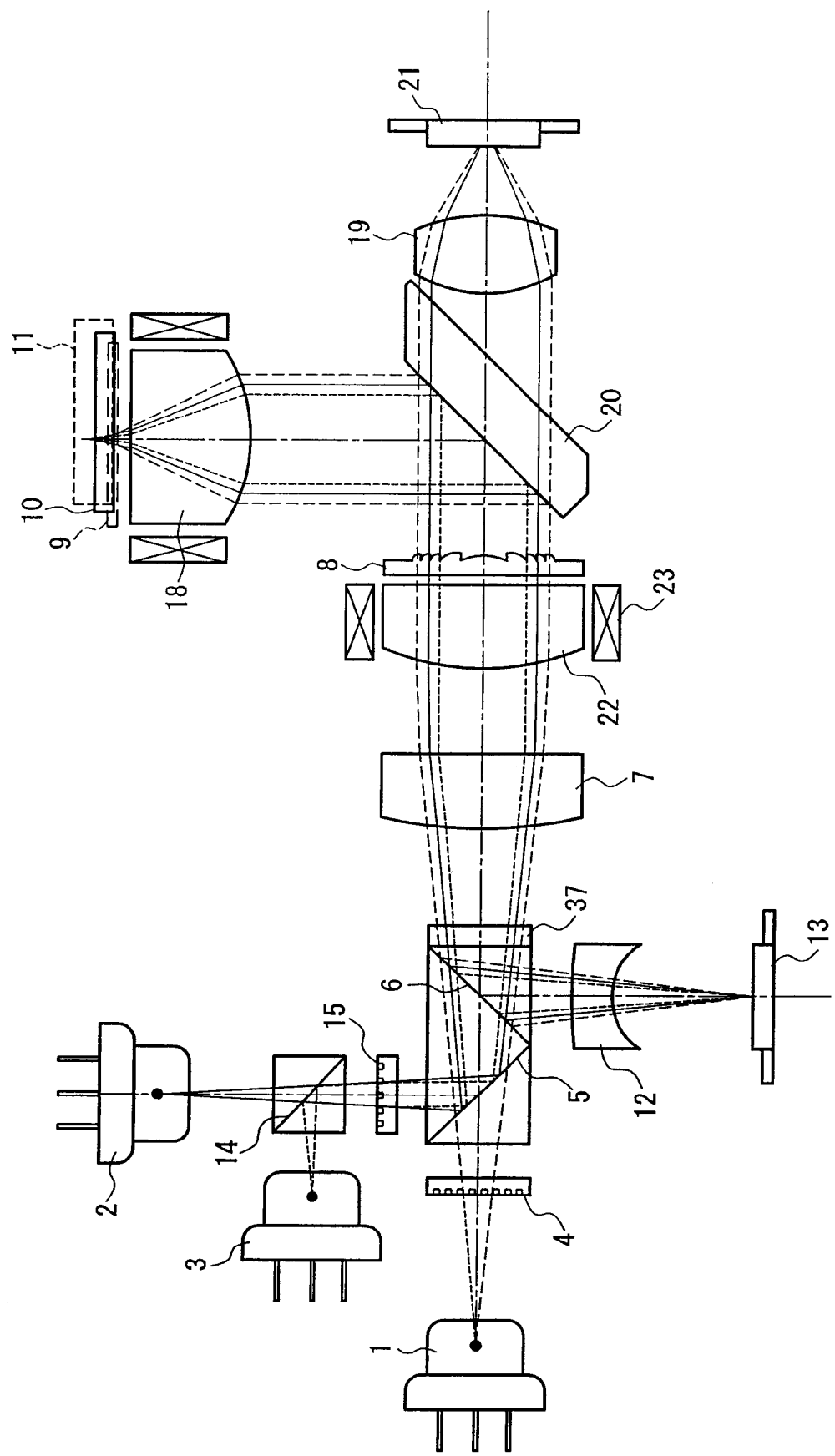
FIG. 3 is a structural overview of the optical head device according to a second embodiment of the present invention.

FIG. 3 is a structural overview of the optical head device according to a second embodiment of the present invention;

As shown in FIG. 3, by further providing a third laser light source 3 of a third wavelength λ3=770 nm to 810 nm, optical disks such as CDs, which have transparent substrate material of a substrate thickness of approximately 1.2 mm, can be recorded or reproduced. It should be noted that in FIG. 3, numeral 11 indicates an optical disk such as a CD with the lowest recording density. Furthermore, numeral 14 indicates a wavelength selection film (dichroic film) for passing the second light beam of the second wavelength λ2 and reflecting the third light beam of the third wavelength λ3. Because the other structures are the same as in the first embodiment described above (see FIG. 1), the same structural members are attached with the same symbols, and their further description has been hereby omitted.

The optical disk 11, which has the lowest recording density, is recorded and reproduced by focusing the third light beam that is emitted by the third laser light source 3 onto the information recording surface (not shown) of the optical disk 11, as given below. That is to say that, as shown in FIG. 3, the substantially linearly polarized light of the third light beam of the third wavelength λ3 (=770 nm to 810 nm, with a standard of 780 nm) that is emitted from the third laser light source 3 is reflected by the wavelength selecting film (dichroic film) 14, after which it is also reflected by the wavelength selecting film (dischroic film) 5 and passes through the beam splitter film 6. The third light beam that passed through the beam splitter film 6 is converted to substantially parallel light by the collimator lens 7, and is then diffracted by the diffraction optical element 8. The third light beam that was diffracted by the diffraction optical element 8 has its light axis bent by the mirror 20, after which it passes through the transparent substrate of the optical disk 11 that has a substrate thickness of 1.2 mm, and is focused onto the information recording surface by the objective lens 18.

The third light beam that was reflected by the information recording surface of the optical disk 11 returns along the original optical path (return path), is again diffracted by the diffraction optical element 8, and is then reflected by the beam splitter film 6, passing through the detecting lens 12 to be incident on the photodetector 13. Thus, the servo signals used in focus control and tracking control, and the information signal, can be obtained by calculating the power output from the photodetector 13.

Furthermore, in the present embodiment, the first to third laser light sources 1 to 3, which are separate devices, are configured so as to emit respectively the first light beam of the first wavelength λ1, the second light beam of the second wavelength λ2, and the third light beam of the third wavelength λ3, however it is also possible to use a single chip laser light source to emit the first to third light beams, thus achieving a reduction in the number of parts.

The inventors of the present invention have found that, if the third light beam of the third wavelength λ3 is further used in the manner of the present embodiment, in contrast to the first conventional example, by configuring the saw tooth-shaped blazed hologram (the diffraction optical element 8) as shown in FIG. 2, such that the first light beam of the first wavelength λ1 (400 nm to 415 nm) is emitted at principally 5N-th order diffracted light (where N is a natural number), the second light beam of the second wavelength $\lambda 2$ (650 nm to 680 nm) is emitted at principally 3N-th order diffracted light, and the third light beam of the third wavelength $\lambda 3$ (780 nm to 810 nm) is emitted at principally 5M-th order diffracted light (2M=N, where M is a natural number) then a high diffraction efficiency can be can be simultaneously achieved with respect to the light beams of the three wavelengths. For example, by configuring the diffraction optical element such that the first light beam of the first wavelength $\lambda 1$ (400 nm to 415 nm) is emitted at principally 10th order diffracted light, the second light beam of the second wavelength $\lambda 2$ (650 nm to 680 nm) is emitted at principally 6th order diffracted light, and the third light beam of the third wavelength $\lambda 3$ (780 nm to 810 nm) is emitted at principally 5th order diffracted light, a high diffraction efficiency can be simultaneously achieved with respect to the light beams of the three wavelengths. This is described below.

If the saw tooth-shaped blazed hologram as shown in FIG. 2 is formed from glass (BK7), then in order to maximize the tenth order diffraction efficiency of the first light beam of the first wavelength $\lambda 1$ (standard value 405 nm), it is preferable that the light path difference, which is dependent on the height h of the saw tooth-shaped blaze shape, is set to ten times the first wavelength $\lambda 1$ and thus the height h of the saw tooth-shaped blaze shape is optimally set to:

$$h = 10\lambda 1/(n1-1)$$

$$= 7640 \text{ nm}.$$

Here, n1 is the refractive index of BK7 with respect to the first wavelength $\lambda 1=405$ nm, and is approximately 1.5302.

Furthermore, the diffraction pattern can be designed by assuming the wavelength $\lambda$ is ten times the first wavelength $\lambda 1$.

At this time, the light path difference that the sawthooth-shaped blaze shape of height h applies to the second light beam of the second wavelength $\lambda 2$ (standard value 660 nm), which records on to or reproduces from DVDs, is:

$$h(n2-1)$$

$$= 3928 \text{ nm}$$

$$= 5.95 \, \lambda 2.$$

Thus, because the light path difference, which the height h of the saw tooth-shaped blaze shape applies to the second light beam of the second wavelength $\lambda 2$ for the purpose of recording or reproducing DVDs is substantially six times the second wavelength $\lambda 2$, the 6th order diffraction efficiency can be set to substantially 100%. Here, n2 is the refractive index of BK7 with respect to the second wavelength $\lambda 2=660$ nm, and is approximately 1.5142.

Furthermore, the light path difference that the sawthooth-shaped blaze shape of height h applies to the third light beam of the third wavelength $\lambda 3$ (standard value 780 nm), which records on to or reproduces from DVDs, is:

$$h(n3-1)$$

$$= 3903 \text{ nm}$$

$$= 4.94 \, \lambda 3.$$

Thus, because the light path difference, which the height h of the saw tooth-shaped blaze shape applies to the third light beam of the third wavelength $\lambda 3$ for the purpose of recording or reproducing CDs is substantially five times the third wavelength $\lambda 3$, the 5th order diffraction efficiency can be set to substantially 100%. Here, n3 is the refractive index of BK7 with respect to the third wavelength $\lambda 3=780$ nm, and is approximately 1.5110.

As for the scattering characteristics, because there is not a large difference even if the materials are changed, then the same effect can be obtained even if another material is selected for the diffraction optical element 8, such as plastic (resin).

Thus, in an optical head device provided with a single or a plurality of laser light sources for emitting the first light beam of the first wavelength $\lambda 1$ (400 nm to 415 nm), the second light beam of the second wavelength $\lambda 2$ (650 nm to 680 nm), the third light beam of the third wavelength $\lambda 3$ (780 nm to 810 nm), and an objective lens for focusing the first to third light beams that are emitted from the laser light sources respectively on to the first to third optical information media, by further providing a diffraction optical element in the light paths of the first to third light beams for principally emitting 5N-th order diffracted light (where N is a natural number) with respect to the first light beam, for principally emitting 3N-th order diffracted light with respect to the second light beam, and for principally emitting 5M-th order diffracted light (2M=N, where M is a natural number) with respect to the third light beam, then a high diffraction efficiency of substantially 100% can be simultaneously achieved with respect to the three light beams. Consequently, high light usage efficiency can be achieved when recording or reproducing CDs, DVDs and optical disks, which have even higher recording and reproduction densities. Furthermore, it is also possible to achieve optical head devices that have no noise generated by stray light from needlessly diffracted light, as well as having low power consumption and low heat generation.

It should be noted that the diffraction optical element 8 according to the first and second embodiments described above is an element that allows transmission of the first light beam of the first wavelength $\lambda 1=400$ nm to 415 nm. Generally, the shorter the wavelength of light, the higher the photon energy, and as a result, there is a tendency toward changes in material properties, and to a deterioration in transmittance and mechanical strength. Consequently, it is preferable that the diffraction optical element 8 is constituted by material with a low absorptance with respect to the first light beam of the first wavelength $\lambda 1=400$ nm to 415 nm. For example, material degradation caused by absorption of photonic energy can be prevented by a material that is approximately 5 mm thick, whose transmittance with respect to the first light beam of the first wavelength $\lambda 1$ is high, and whose absorptance is not more than 5%. Moreover, high reliability can be obtained by using a material that is approximately 5 mm thick, and whose absorptance of the first light beam of the first wavelength $\lambda 1$ is not more than 3%. Consequently, it is preferable to use an inorganic glass material such as quartz as the material for constituting the diffraction optical element 8. Furthermore, it is also possible to use a resin material, whose advantages are excellent processability and light weight, as the material that constitutes the diffraction optical element 8, however in this case, it is preferable to use material such as amorphous polyolefins that have low absorptance of the first light beam of the first wavelength $\lambda 1$.

Figure 4:
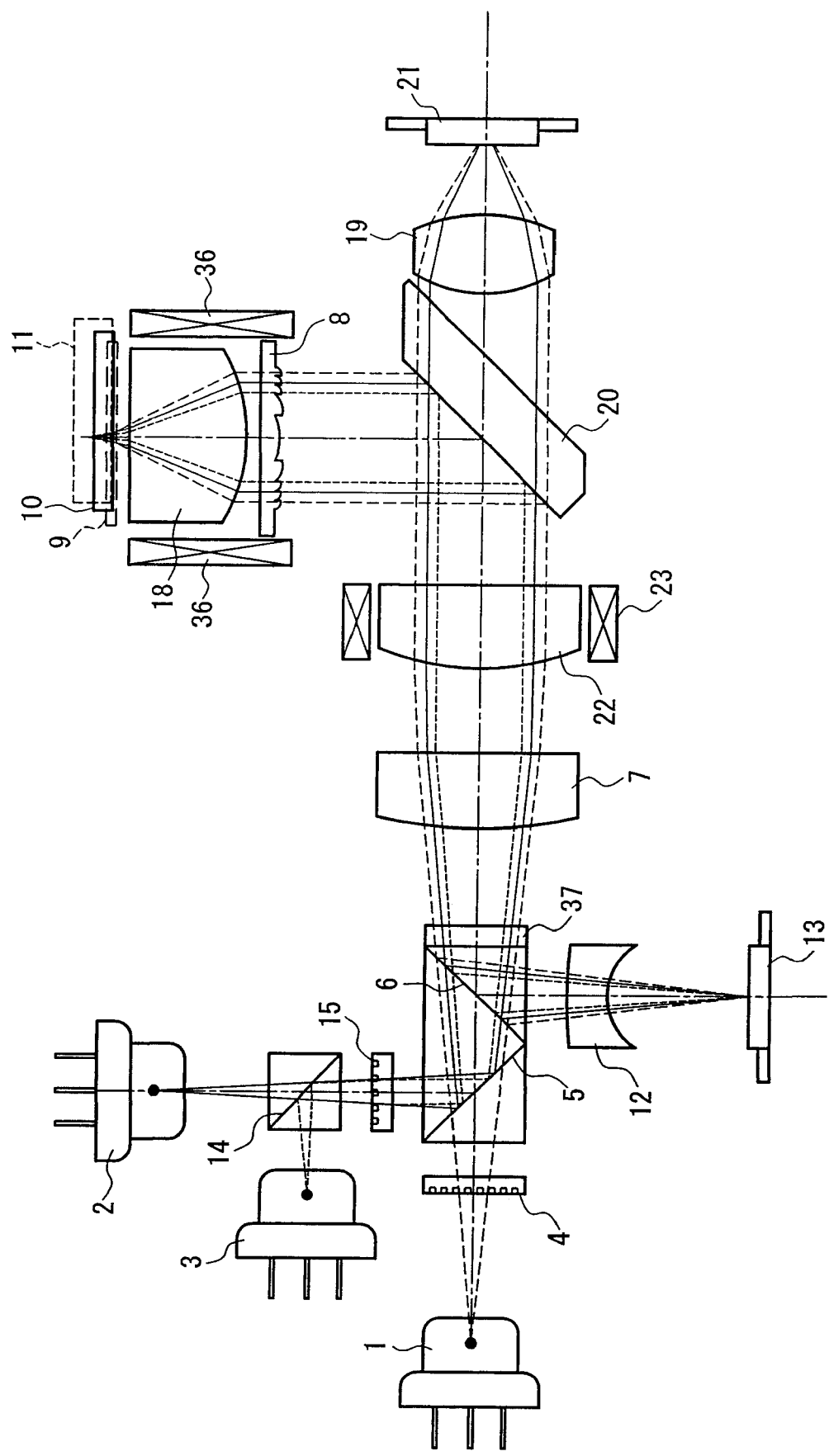
FIG. 4 is a structural view of another optical head device according to an embodiment of the present invention.

Furthermore, as shown in FIG. 4, by configuring the diffraction optical element 8, which is described according to the first and second embodiments, such that the optical element 8 is disposed in the vicinity of the objective lens 18 and is fixed to the objective lens 18 as a single piece, the diffraction optical element 8 and the objective lens 18 can be driven as a single piece by the drive apparatus 36 during focus control and tracking control, and the following effect can be achieved. That is to say, it is possible to suppress the occurrence of aberrations even if the objective lens 18 moves due to tracking during recording or reproduction of the optical disks 9 to 11, because axial displacement of the diffraction optical element 8 and the objective lens 18 can be prevented. Furthermore, although the grating pitch of the diffraction optical element 8 becomes finer toward the outer circumferential portion, if the configuration such as described above is employed, then because there is no necessity to redundantly make the outer circumferential portion of the diffraction optical grating, fabrication of the diffraction optical element is simplified.

Furthermore, the diffraction optical element 8 shown in the first and second embodiments described above is not limited to an optical element for the correction of chromatic aberrations, but can also be used as an optical element for formation of light for detecting the servo signal used in conjunction with the detection lens 12, and in this case, a similar effect can be obtained as is described above.

Third Embodiment

Figure 5:
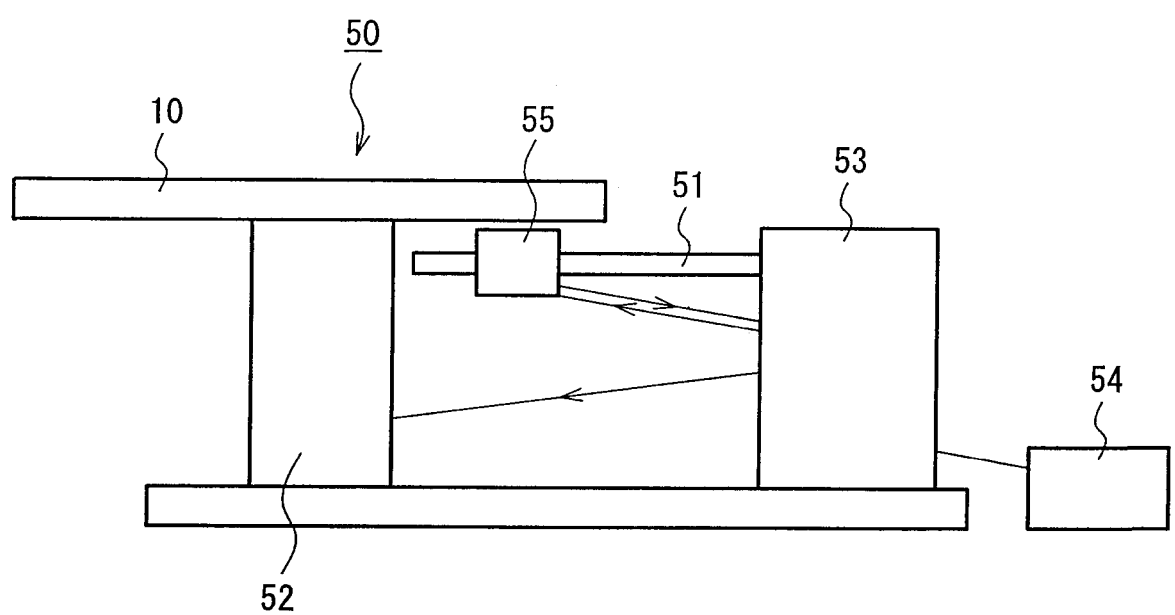
FIG. 5 is a structural overview of an optical information apparatus according to a third embodiment of the present invention.

FIG. 5 is a structural overview of an optical information apparatus according to a third embodiment of the present invention. As shown in FIG. 5, the optical disk 10 (or 9 or 11, this is the same below) is rotatably driven by an optical disk drive portion 52 that is provided with a motor or the like (if an optical card is used in place of the optical disk 10, then the card is translatably driven). Numeral 55 indicates the optical head device shown in the first and second embodiments, and the optical head device 55 is coarsely adjusted by an optical head device drive apparatus 51 to where the track containing the desired information is present on the optical disk 10.

Furthermore, the optical head device 55 sends a focus error signal and tracking error signal to an electric circuit 53, which acts as a control portion, in accordance with the positional relationship with the optical disk 10. The electric circuit 53 sends signals for the purpose of fine controlling the objective lens to the optical head device 55 in accordance with these signals. Thus, based on these signals, the optical head device 55 carries out focus control and tracking control of the optical disk 10, and then reads, records or erases information. Furthermore, the electric circuit 53 also controls the optical disk drive portion 52 and the laser light sources within the optical head device 55 in accordance with the signals obtained from the optical head device 55. It should be noted that in FIG. 5 numeral 54 indicates a power source or a connecting portion to an external power source.

In the optical information apparatus 50 of the present embodiment, using the optical head device 55, high light usage efficiency can be achieved when recording or reproducing DVDs, which are illustrated in the first and second embodiments described above, and optical disks that have even higher recording and reproduction densities. Furthermore, because the optical head device of the present invention, which has no noise generated by stray light from needlessly diffracted light, as well as having low energy consumption and low heat generation, is used, it is possible to achieve an optical information apparatus capable of accurately and stably reproducing information, and whose power consumption and thermal generation are low.

Fourth Embodiment

Figure 6:
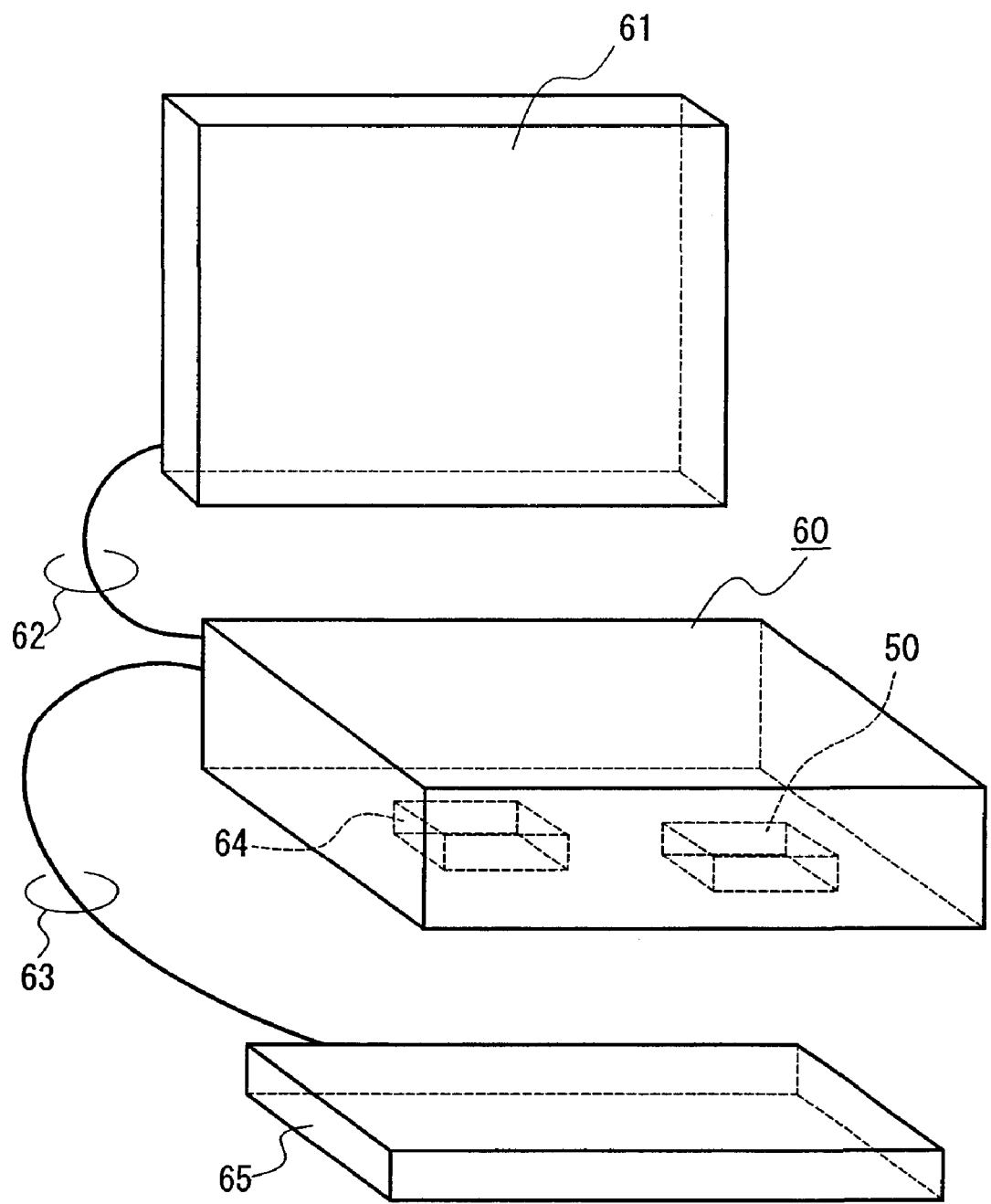
FIG. 6 is a perspective overview showing a computer according to a fourth embodiment of the present invention.

FIG. 6 is a perspective view that schematically shows a computer according to the fourth embodiment of the present invention.

As shown in FIG. 6, a computer 60 according to the present embodiment is constituted by the optical information apparatus 50 of the third embodiment described above, an input device 65 for the purpose of inputting information, such as a keyboard, a mouse, or a touchpanel, a processing unit 64 such as central processing unit (CPU) for the purpose of processing in accordance with information input from the input device 65 via an input cable 63 or read out from the optical information apparatus 50, an output device 61 such as a cathode ray tube, liquid crystal display or printer, for the purpose of displaying or outputting the information input from the input device 65, the information read out from the optical information apparatus 50 or the information that was a result calculated by the processing unit 64. It should be noted that in FIG. 6, numeral 62 indicates an output cable for the purpose of outputting information to the output device 61 such as the results calculated by the processing unit 64.

Fifth Embodiment

Figure 7:
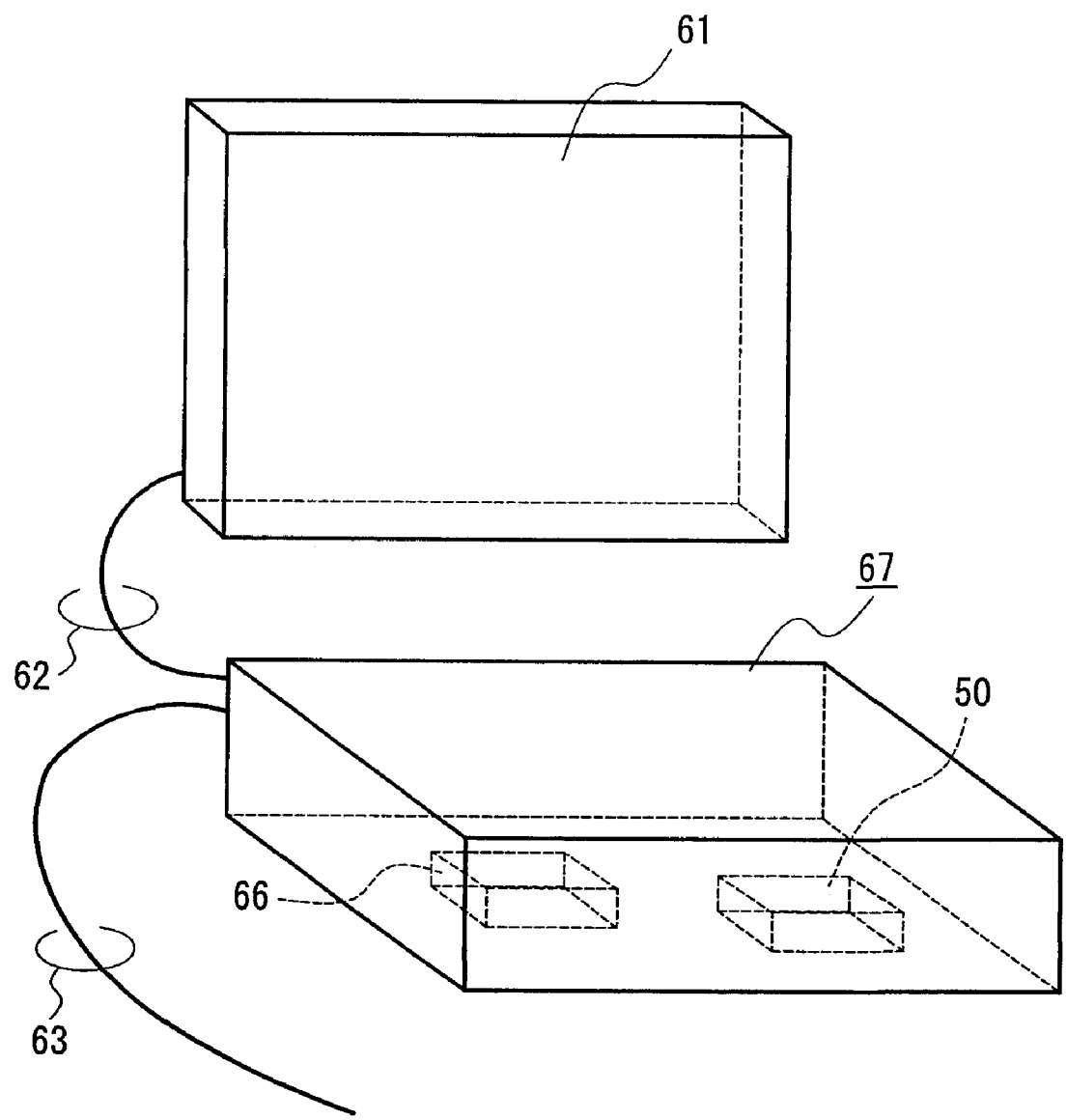
FIG. 7 is a perspective overview showing an optical disk player according to a fifth embodiment of the present invention.

FIG. 7 is a perspective view that schematically shows an optical disk player according to the fifth embodiment of the present invention.

As shown in FIG. 7, an optical disk player 67 according to the present embodiment is provided with an optical information apparatus 50 according to the third embodiment, and an information-to-image conversion device (such as a decoder 66) for converting an information signal obtained from the optical information apparatus 50 into an image.

It should be noted that it is also possible to utilize the present configuration as a car navigation system. By installing loading the car navigation system of the present configuration into an automobile, a plurality of optical disks of different varieties can be stably recorded and reproduced inside the automobile. Furthermore, because power consumption is low, then without limitation to just car navigation systems, it is possible to obtain the benefits of using the navigation system over a wide range of applications such as for listening to music, or watching movies. Furthermore, it is also possible to set this configuration such that the output device 61 such as cathode ray devices, liquid crystal devices and printers are connected via the output cable 62.

Sixth Embodiment

Figure 8:
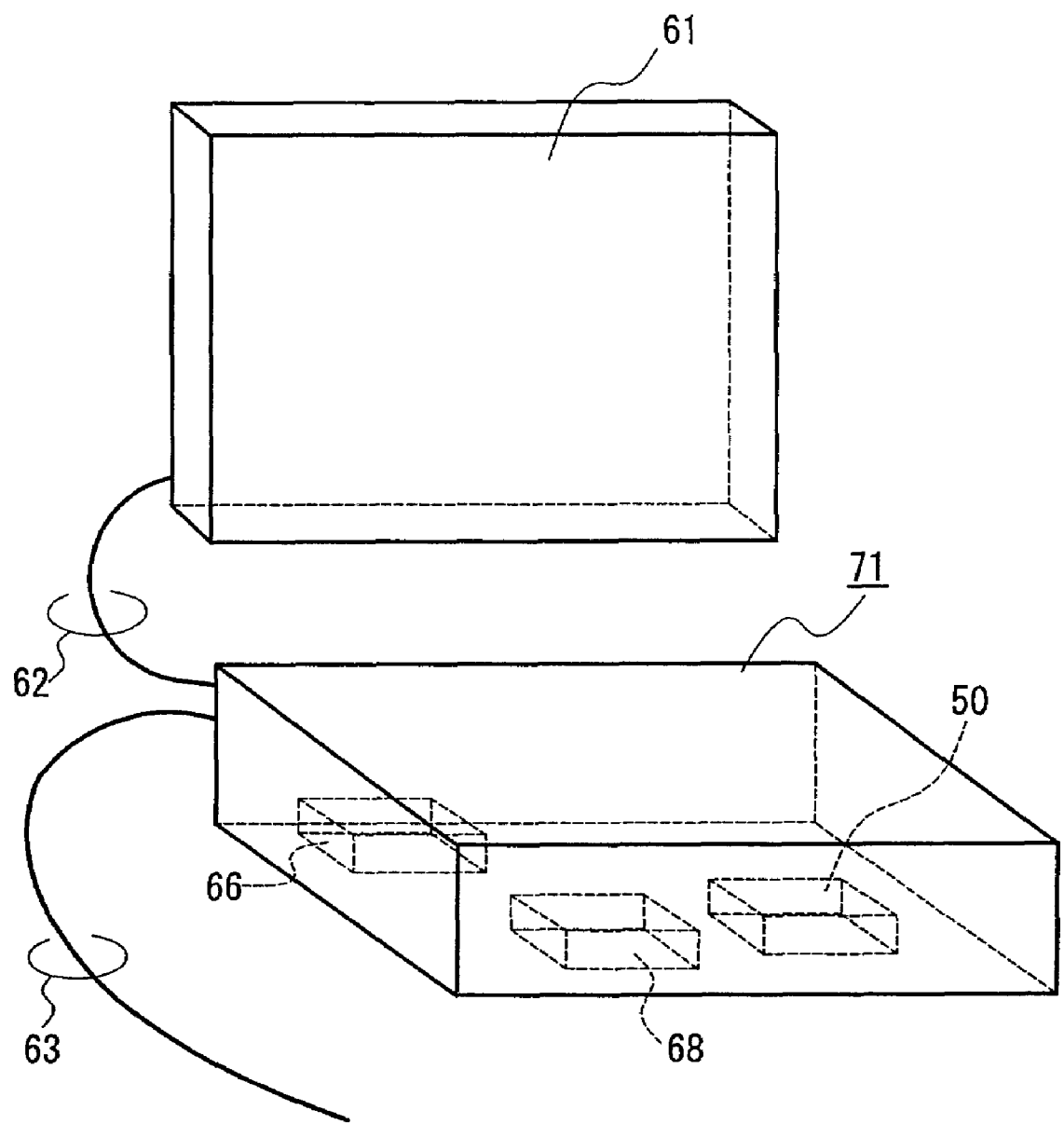
FIG. 8 is a perspective overview showing an optical disk recorder according to a sixth embodiment of the present invention.

FIG. 8 is a perspective view that schematically shows an optical disk recorder according to the sixth embodiment of the present invention.

As shown in FIG. 8, an optical disk recorder 71 according to the present embodiment is provided with the optical information apparatus 50 according to the third embodiment, and an image-to-information converter (such as an encoder 68), for converting image information into information for recording onto the optical disk by the optical information apparatus 50.

It should be noted that it is possible to have a configuration that includes an information-to-image conversion device (such as the decoder 66) that converts the information signal obtained from the optical information apparatus 50 to images, and thus, it is possible to simultaneously display on a monitor during recording to the optical disk, or to reproduce portions that are already recorded.

Furthermore, it is also possible to configure the optical disk recorder such that output devices 61 such as cathode ray devices, liquid crystal devices or printers are connected via the output cable 62.

Computers, optical disk players and optical disk recorders provided with the optical information apparatus 50 described according to the third embodiment, or employing methods for recording and reproducing described above, are capable of stably recording or reproducing a plurality of optical disks of different varieties, and because power consumption is low, it is possible to use them in a wide range of applications.

Seventh Embodiment

Figure 9:
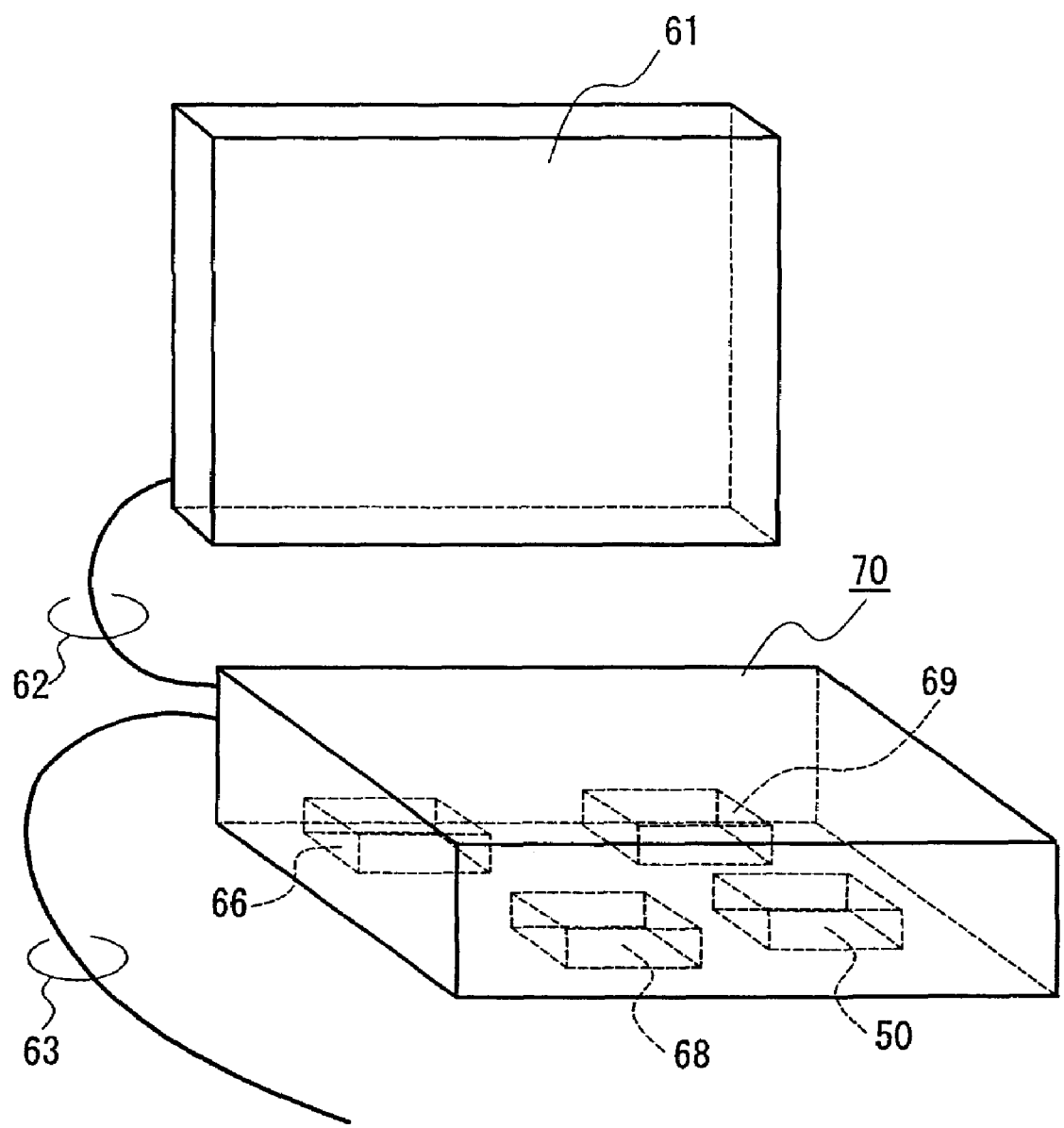
FIG. 9 is a perspective overview showing an optical disk server according to a seventh embodiment of the present invention.
Figure 10:
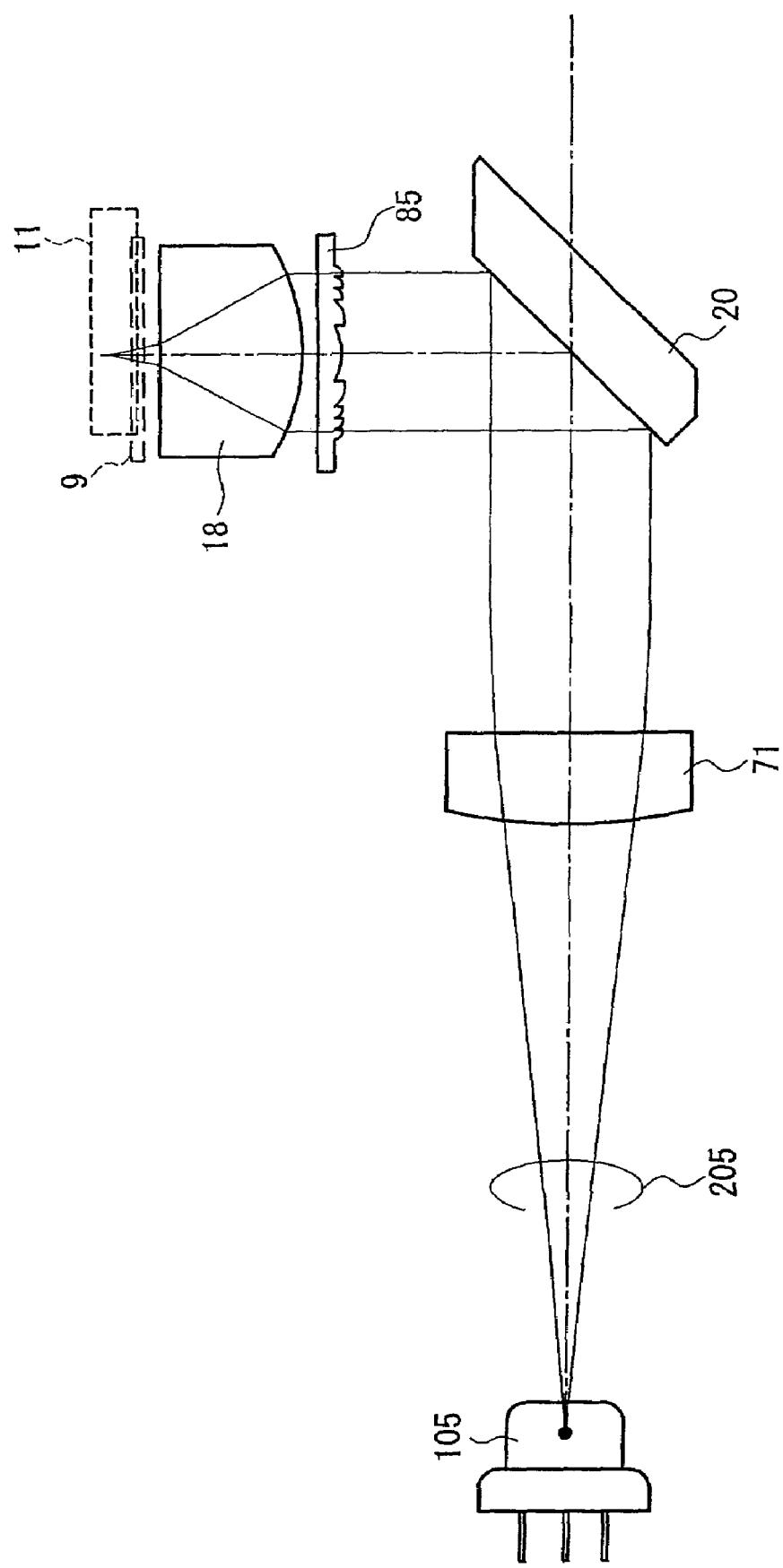
FIG. 10 is a cross-section overview showing the basic structure and light transmission state of an optical head device according to the first conventional example.

FIG. 9 is a perspective view that schematically shows an optical disk server according to the seventh embodiment of the present invention.

As shown in FIG. 9, an optical disk server 70 of the present embodiment is provided with the optical information apparatus 50 described above according to the third embodiment, and an input/output wireless terminal (wireless input/output terminal) 69 that is a wireless receiving device and transmitting device for the purpose of reading in information from an external portion for recording to the optical information apparatus 50, and for output to an external portion of information read out by the optical information apparatus 50 (ie. for the purpose of exchanging information between the optical information apparatus 50 and an external portion).

By the structure above, it is possible to utilize the optical disk server 70 as a shared information server that exchanges information back and forth with devices that contain a plurality of wireless receiving and transmitting terminals, such as computers, telephones and television tuners. Furthermore, as a plurality of differing varieties of optical disks can be stably recorded and reproduced, the optical disk server 70 can be used in a wide range of applications.

It should be noted that a configuration is also possible in which an image-to-information converting device (such as the encoder 68) is added so as to convert the image information into information for recording onto the optical disk by the optical information apparatus 50.

Furthermore, it is also possible to have a configuration in which an information-to-image converting device (such as the decoder 66) is added that converts the signal obtained from the optical information apparatus 50 to images, and thus it is possible to simultaneously display on a monitor during recording to the optical disk, or reproduce portions already recorded.

Furthermore, it is also possible to configure the optical disk server such that output devices 61 such as cathode ray devices, liquid crystal devices or printers are connected via the output cable 62.

Furthermore, according to the fourth to seventh embodiments, the output device 61 is shown in FIGS. 6 to 9, but by simply providing an output terminal without the output device 61, a merchandising model is also possible in which this is sold separately. Furthermore, input devices are not shown in FIGS. 7 to 9, however a merchandising model is also possible in which input devices such as keyboards, mouses or touchpanels are provided.

Furthermore, it is possible to obtain a similar effect as an optical disk even if an optical card is used as the optical information medium according to the present invention, instead of the optical disk. That is to say, the present invention can be applied to all optical information media that are recorded or reproduced by the formation of minute focused spots.

The invention claimed is:

1. An optical head device, comprising:
   one or a plurality of laser light sources for emitting a first light beam of a first wavelength $\lambda 1$ (400 nm to 415 nm) and a second light beam of a second wavelength $\lambda 2$ (650 nm to 680 nm);
   an objective lens on which the first and second light beams that are emitted from the laser light source are incident and
   a diffraction optical element arranged in a light path of the first and second light beams;
   wherein the diffraction optical element includes a diffraction pattern that causes 5N-th order diffracted light (N is a natural number) to be emitted with respect to the first light beam, and causes 3N-th order diffracted light to be emitted with respect to the second light beam; and
   wherein the laser light source further emits a third light beam of a third wavelength $\lambda 3$ (780 nm to 810 nm); and
   wherein the diffraction pattern of the diffraction optical element causes 5M-th order diffracted light (2M=N, M is a natural number) to be emitted with respect to the third light beam.

2. The optical head device according to claim 1,
   wherein the diffraction pattern of the diffraction optical element causes 5N-th order diffracted light to be emitted with highest diffraction efficiency with respect to the first light beam, 3N-th order diffracted light to be emitted with highest diffraction efficiency with respect to the second light beam, and 5M-th order diffracted light to be emitted with highest diffraction efficiency with respect to the third light beam.

3. An optical head device, comprising:
   one or a plurality of laser light sources for emitting a first light beam of a first wavelength $\lambda 1$ (400 nm to 415 nm), a second light beam of a second wavelength $\lambda 2$ (650 nm to 680 nm) and a third light beam of a third wavelength $\lambda 3$ (780 nm to 810 nm);
   an objective lens on which the first to third light beams that are emitted from the laser light source are incident; and
   a diffraction optical element arranged in a light path of the first to third light beams;
   wherein a diffraction pattern is formed on the diffraction optical element, the diffraction pattern including a pattern in which a light path difference L, which is dependent on a height of a cross-section of the diffraction pattern, satisfies $L=10\lambda 1=6\lambda 2=5\lambda 3$.

4. The optical head device according to claim 3, wherein the diffraction optical element acts as a convex lens.

5. The optical head device according to claim 3,
   wherein the diffraction optical element is disposed close to the objective lens, and the diffraction optical element and the objective lens are fixed as a single piece.

6. An optical information apparatus, comprising:
   the optical head device according to claim 3;
   an optical information medium drive portion for driving the optical information medium; and
   a control portion for receiving a signal obtained from the optical head device, and based on that signal, for controlling the optical information medium drive portion as well as the laser light source and the objective lens in the optical head device.

7. A computer, comprising:
the optical information apparatus according to claim 6;
an input device for inputting information;
a processing unit for processing based on information input from the input device and/or information read out by the optical information apparatus; and
an output device for display or output of the information input by the input device, information read out by the optical information apparatus, or a result processed by the processing unit.

8. An optical disk player, comprising:
the optical information apparatus according to claim 6; and
an information-to-image conversion apparatus for converting the information signal obtained from the optical information apparatus to an image.

9. A car navigation system, comprising the optical disk player according to claim 8.

10. An optical disk recorder, comprising:
the optical information apparatus according to claim 6; and
an image-to-information conversion apparatus for converting image information to information for recording onto the optical information medium by the optical information apparatus.

11. An optical disk server, comprising:
the optical information apparatus according to claim 6; and
a wireless input/output terminal for exchanging information between the optical information apparatus and an external portion.

* * * * *